(No Model.)

J. CAIN.
DIE FOR MAKING VISE JAWS.

No. 298,285. Patented May 6, 1884.

Witnesses.
W. B. Corwin
Jno. K. Smith

Inventor.
John Cain
by Bakewell & Kerr
his attys

UNITED STATES PATENT OFFICE.

JOHN CAIN, OF PITTSBURG, PENNSYLVANIA, ASSIGNOR TO THE GILLESPIE TOOL COMPANY, OF SAME PLACE.

DIE FOR MAKING VISE-JAWS.

SPECIFICATION forming part of Letters Patent No. 298,285, dated May 6, 1884.

Application filed December 10, 1883. (No model.)

*To all whom it may concern:*

Be it known that I, JOHN CAIN, of Pittsburg, in the county of Allegheny and State of Pennsylvania, have invented a new and useful Improvement in Dies for Making Vise-Jaws; and I do hereby declare the following to be a full, clear, and exact description thereof.

Heretofore vise-jaws have commonly been made by hand-forging. A suitable bar of iron was taken and the end split and drawn out laterally to form the upper end of the stock. Then a flat piece of steel suitable for the biting edge or face of the jaw was taken and welded to a short bar of iron, and then the iron bar, with its steel face, was again heated and welded to the upper end of the stock. This operation exposed the steel to two welding-heats, which repeated heating had the customary deleterious effect on the steel. It was the common experience that the head of the stock could not be properly shaped if the iron bar was welded thereto first and the steel welded on afterward, so that it has been preferred to first weld the steel to the iron bar and then weld the latter to the stock.

The operation just described not only involved considerable labor, but also required a high degree of skill and was exceedingly slow, the usual product of two men being sixteen such jaws in a day of ten hours.

My invention is designed to effect the production of a better jaw with less injury to the steel face, with less skilled labor and more uniformity of shape, and a greatly-increased product with the same amount of labor.

To enable others skilled in the art to make and use my invention, I will now describe it by reference to the accompanying drawings, in which—

Figure 1:
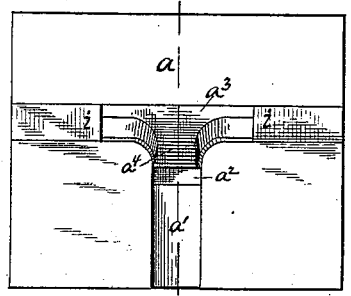
Figure 2:
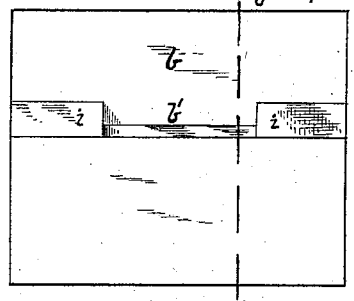
Figure 3:
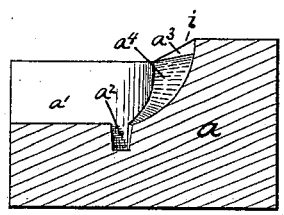
Figure 4:
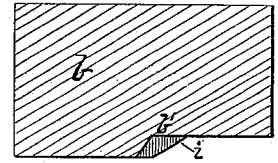
Figure 5:
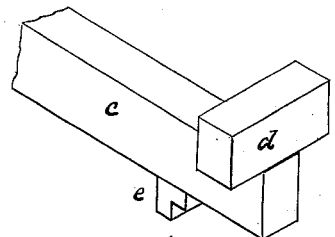
Figure 6:
Figure 7:
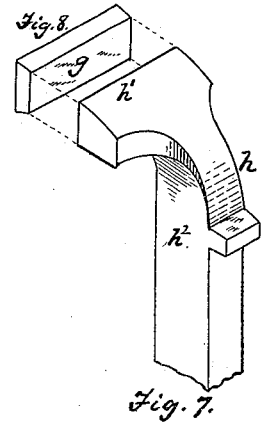

Figures 1 and 2 are plan views of my improved dies. Figs. 3 and 4 are sections of the same on the lines $x\,x$ of Figs. 1 and 2. Fig. 5 is a view of the blank. Fig. 6 is a detail. Fig. 7 is a perspective view of the finished blank, and Fig. 8 is a view of the steel bit.

Like letters of reference indicate like parts in each.

I construct a pair of dies, $a\,b$, which are designed to be used with an ordinary steam-hammer or other suitable reciprocating mechanism. When used with a hammer or drop, the die $a$ is the bed-die or anvil, and the die $b$ is the reciprocating die or drop. In the die $a$ is a longitudinal cavity, $a'$, designed to receive the shank of the jaw. At one end of the cavity $a'$ is a recess, $a^2$, for forming the spur or projection on the back of the jaw, and beyond the end of the recess $a'$ is a lateral recess or cavity, $a^3$, which is connected with the recess $a'$ by a diagonally-rising intermediate cavity, $a^4$. The shape of the bottom of the cavities $a^3$ and $a^4$ is immaterial, as they may be rounded, square, or of other desired form. The cavity $a'$ conforms in shape to the shape in cross-section of the bar of which the stock of the jaw is made. The working-face of the die $b$ is square and flat, so as to produce a similar shape upon the biting side or edge of the jaw, in order to afford greater facility for welding the steel face on the latter. It may, however, be made of any desired shape, as the back side of the steel bit can be made to correspond thereto. The blank is formed of a suitable bar, $c$, usually rectangular in cross-section, and of a cross-bar, $d$, of similar section and much shorter, and a small block, $e$, preferably of angle shape. The bar $c$ is heated until it is soft enough to cause the piece $e$ to adhere thereto. Then the latter is stuck on the under side and the bar $d$ is laid on top, all as shown in Fig. 5. In this condition it is inserted into a suitable heating-furnace, and when brought to the proper temperature is withdrawn and laid on the anvil-die $a$. It is then struck the requisite number of blows with the die $b$ to force it down into the die-cavity $a'\,a^2\,a^3\,a^4$, when by the combined action of the two dies it is transformed into the shape shown in Fig. 7, where it is in condition to have the steel bit $g$ welded thereto.

The operation just described produces a perfectly-formed jaw, the metal being solidified and closely and perfectly welded. It is apparent that the skilled labor heretofore necessary in imparting the proper form to the jaw by hand is entirely dispensed with, and that no more skill is necessary in its formation than such as will determine when the metal is at the proper heat for exposing it to the action of the dies. It is also apparent that the operation can be carried on with great rapidity, and that the result will be a greatly-increased product. In fact, where heretofore two men have been able to produce sixteen of these jaws in a day, the same number of men can by the use of my improvement make fifty of said jaws in the same time. This of course involves the welding of the bit $g$ and the finishing of the jaw. As all the jaws are made in a common die the product will be uniform. After the jaw has been brought to the form shown in Fig. 7 it is put through the subsequent operations of punching, threading, &c. As my improvement does not relate to this part of the operation, I will not describe the same.

It will be noticed that the lateral recess $a^3$ is in a higher plane than the recess $a'$, and that the cavity $a^4$ connects them. This construction is for the purpose of forming the side of the head $h'$ of the jaw $h$, Fig. 7, at one side, so that when the bit $g$ is applied its biting face or edge shall certainly be beyond or outside of the side of the stock $h^2$. The preferred construction is to form the head $h'$ considerably beyond the side of the stock, as is shown in Fig. 7, where the bit $g$ has not been welded on. This is necessary for fitting the jaw for many of the uses to which it is commonly applied. To better accomplish this, the face of the die $b$ is recessed, as at $b'$, to receive the upper portion of the finished head $h'$. The bottom of the cavity $b'$ constitutes the working-face of the die $b$, the sides of the cavity aiding in shaping the ends and lower edge of the head. Preferably the dies $a$ $b$ have both an inclined face, as at $i$, being counterparts, and the cavities $a^3$ and $b'$, in which the head $h'$ is formed, are made in these inclined surfaces.

What I claim, and desire to secure by Letters Patent, is—

1. The die $a$, for forming vise-jaws, having a recess, $a'$, for receiving the shank, a lateral recess, $a^3$, for forming the head, and an intermediate connecting-cavity, $a^4$, substantially as and for the purposes described.

2. The die $a$, for forming vise-jaws, having recesses $a'$ $a^2$ $a^3$ $a^4$, substantially as and for the purposes described.

3. The combination of the die $a$, having a cavity, $a'$ $a^3$ $a^4$, with the die $b$, having a cavity, $b'$, substantially as and for the purposes described.

In testimony whereof I have hereunto set my hand this 30th day of November, A. D. 1883.

JOHN CAIN.

Witnesses:
W. B. CORWIN,
THOMAS B. KERR.